(12) United States Patent
Javan Roshtkhari et al.

(10) Patent No.: US 11,455,745 B2
(45) Date of Patent: Sep. 27, 2022

(54) SYSTEM AND METHOD FOR IMAGE REGISTRATION AND CAMERA CALIBRATION USING LEARNED ERROR FUNCTIONS

(71) Applicant: Sportlogiq Inc., Montreal (CA)

(72) Inventors: Mehrsan Javan Roshtkhari, Beaconsfield (CA); Wei Jiang, Victoria (CA); Juan Camilo Gamboa Higuera, Montreal (CA); Kwang Moo Yi, Victoria (CA)

(73) Assignee: Sportlogiq Inc., Montreal (CA)

( * ) Notice: Subject to any disclaimer, the term of this patent is extended or adjusted under 35 U.S.C. 154(b) by 316 days.

(21) Appl. No.: 16/878,748

(22) Filed: May 20, 2020

(65) Prior Publication Data

US 2020/0372679 A1 Nov. 26, 2020

Related U.S. Application Data

(60) Provisional application No. 62/850,910, filed on May 21, 2019.

(51) Int. Cl.
*G06T 7/80* (2017.01)
*G06T 7/38* (2017.01)
*H04N 5/232* (2006.01)

(52) U.S. Cl.
CPC ............ *G06T 7/80* (2017.01); *G06T 7/38* (2017.01); *H04N 5/23229* (2013.01); *G06T 2207/20084* (2013.01); *G06T 2207/30228* (2013.01)

(58) Field of Classification Search
CPC ... G06T 5/006; G06T 3/4038; G06T 2200/24; G06T 7/80; G06T 15/205;
(Continued)

(56) References Cited

U.S. PATENT DOCUMENTS 9,883,163 B2 1/2018 Carr et al.
2015/0093042 A1 4/2015 Zhu et al.
(Continued)

OTHER PUBLICATIONS

European Search Report issued in corresponding EP application No. 20175677; search completed Oct. 8, 2020.
(Continued)

*Primary Examiner* — Ming Wu
(74) *Attorney, Agent, or Firm* — CPST Intellectual Property Inc.; Brett J. Slaney

(57) ABSTRACT

A system and method are provided for registering input images to reference objects to generate output parameters. The method includes obtaining an input image and a reference object, wherein the reference object comprises a reference image or a template corresponding to a model of content in the reference image. The method also includes performing a registration of the input image by estimating a geometric transform and/or a set of non-linear transform parameters, without using predefined image features. The method also includes measuring a misalignment error between the input images and the reference object and generating a set of output parameters. The output parameters can include a set of one or more camera parameters or a set of geometric and non-linear transformation parameters.

20 Claims, 6 Drawing Sheets

(58) Field of Classification Search
CPC ........... G06T 2207/20081; G06T 2207/20084; H04N 1/3876; H04N 5/23238; H04N 5/23229

See application file for complete search history.

(56) References Cited

U.S. PATENT DOCUMENTS

| | | | |
|---|---|---|---|
| 2016/0295184 A1* | 10/2016 | Ishikawa | H04N 9/3147 |
| 2017/0184698 A1* | 6/2017 | Rueth | G09G 3/006 |
| 2017/0221226 A1* | 8/2017 | Shen | G06T 7/80 |
| 2018/0116583 A1* | 5/2018 | Cook | A61B 5/1079 |
| 2018/0336704 A1 | 11/2018 | Javan Roshtkhari et al. | |

OTHER PUBLICATIONS

Jiang, Wei et al.: "Optimizing Through Learned Errors for Accurate Sports Field Registration", arxiv.org, Cornell University Library, 201 Olin Library Cornell University Ithaca, NY 14853, Sep. 17, 2019.

Muenzing, Sascha E.A.: "Learning-Based Approaches to Deformable Image Registration", Jun. 2014 (Jun. 11, 2014), XP055737965, Retrieved from the Internet: URL:https://dspace.1ibrary.uu.nl/bitstream /handle/1874/363668/Muenzing.pdf?sequence=1 [retrieved on Oct. 8, 2020].

Eppenhof, Koen A.J. et al.: "Error 10 estimation of deformable image registration of pulmonary CT scans using convolutional neural networks", Journal of Medical Imaging, Society of Photo-Optical Instrumentation Engineers, 1000 20th St. Bellingham WA 98225-6705, USA, vol. 5, No. 2, Apr. 1, 2018 (Apr. 1, 2018), p. 24003 [retrieved on May 10, 2018].

Tkach, Anastasia et al.; Online Generative Model Personalization for Hand Tracking. ACM Transactions on Graphics, 2017.

Gupta, A. et al.; Using Line and Ellipse Features for Rectification of Broadcast Hockey Video. Computer and Robot Vision (CRV), 2011 Canadian Conference on:32-39, 2011.

Puwein J. et al.; Robust Multi-view Camera Calibration for Wide-baseline Camera Networks. In IEEE Winter Conference on Applications of Computer Vision, 2011.

Homayounfar, N. ; Sports Field Localization via Deep Structured Models. In Conference on Computer Vision and Pattern Recognition, CVPR, 2017.

Sharma, R.A., et al.; Automated Top View Registration of Broadcast Football Videos. In IEEE Winter Conference on Applications of Computer Vision, 2018.

Chen, J. et al.; Little. Sports Camera Calibration via Synthetic Data. arXiv Preprint, 2018.

Yan, Q., et al.; HEASK: Robust Homography Estimation Based on Appearance Similarity and Keypoint Correspondences. Pattern Recognition, 2014.

Kendalli, A. et al; Posenet: A Convolutional Network for Real-Time 6-DOF Camera Relocalization. In International Conference on Computer Vision, 2015.

He, K. et al.; Deep Residual Learning for Image Recognition. In Conference on Computer Vision and Pattern Recognition, 2016.

Miyato, T. et al.; Spectral Normalization for Generative Adversarial Networks. In International Conference on Learning Representations, 2018.

Zitova, B. et al.; "Image Registration Methods: A Survey", Image and Vision Computing, Elsevier, Guildford, GB, vol., No., Oct. 1, 2003 (Oct. 1, 2003), pp. 977-1000, XP001189327.

European Examination Report issued in corresponding EP application No. 20175677; dated Jul. 7, 2022.

* cited by examiner

SYSTEM AND METHOD FOR IMAGE REGISTRATION AND CAMERA CALIBRATION USING LEARNED ERROR FUNCTIONS

CROSS-REFERENCE TO RELATED APPLICATION(S)

This application claims priority to U.S. Provisional Patent Application No. 62/850,910 filed on May 21, 2019, the contents of which are incorporated herein by reference.

TECHNICAL FIELD

The following relates to systems and methods for image registration and camera calibration using learned error functions, for example to automatically estimate a geometric transformation between two images, or between an image and a template model of the real world, to automatically estimate a homography transformation and camera parameters and implement a self-camera calibration mechanism.

BACKGROUND

Estimating the geometric relationship between a model and an observed image is a fundamental computer vision problem (references [1], [2]). This problem has been addressed in both image registration and camera calibration literature. Many vision applications, including sport analytics and mixed and augmented reality, rely on accurately computed geometric transforms. Camera pose estimation, or camera calibration from a single image is ill-posed by nature. That is, three-dimensional (3D) information tends to be lost when projected onto two dimensions (2D) and, thus, a good enough initial position combined with proper optimization can lead to accurate registrations (reference [3]). In practice, the majority of the camera calibration algorithms rely on capturing multiple images of reference objects to estimate camera parameters. Reference objects are usually a specifically designed calibration object with known dimensions and 3D geometric information, which is referred to as a "calibration pattern".

A calibration pattern can include a 3D object, a 2D plane, or a one-dimensional (1D) line. The camera parameters are being estimated using different views of the calibration pattern either by moving the camera on the calibration pattern [4]. In the standard camera calibration algorithms, the correspondence between images and geometric features in the real world need to be identified to enable estimating the unknown camera parameters.

Prior attempts at registering a sports field to broadcast videos (references [5] [6]) typically rely on a set of pre-calibrated reference images, mining the database to find similar images with a known camera pose or homography. These calibrated references are used to estimate a relative pose to the image of interest. To retrieve the relative pose, these methods either assume that images correspond to consecutive frames in a video (reference [5]), or use local features, such as Scale Invariant Feature Transform (SIFT) and Maximally Stable Extremal Regions (MSER), to find correspondences (reference [6]). These methods, however, require that the set of calibrated images contains images with a similar appearance to the current image of interest, as traditional local features are found to be weak against long-term temporal changes.

To overcome these limitations in prior approaches, some of the recent approaches have focused on converting broadcast videos into images that only contain information about sports fields, e.g. known marker lines, then perform a registration (references [7], [8], [9]).

Prior attempts at performing a homography estimation between images include sparse feature-based approaches (reference [10]) and dense direct approaches, where in both approaches the homography is obtained by finding feature point correspondences between the two images and finding a geometric transformation that minimizes the projection error. Regardless of being sparse or dense, these approaches are mainly found to be limited by either the quality of the local features, or by the robustness of the objective function used for optimization. Deep learning-based approaches have also been used to learn the features for estimating homography between two images. Some approximation techniques such as deep neural networks (DNNs) have also been studied in prior solutions and have proposed to directly regress from one image to the six degrees-of-freedom (6 DoF) pose of a camera.

It is an object of the following to address at least one of the above-noted disadvantages.

SUMMARY

There is provided a method for registering input images to reference objects to generate output parameters, the method comprising: obtaining an input image and a reference object, wherein the reference object comprises a reference image or a template corresponding to a model of content in the reference image; performing a registration of the input image by estimating a geometric transform and/or a set of non-linear transform parameters, without using predefined image features; measuring a misalignment error between the input images and the reference object; and generating a set of output parameters, comprising a set of one or more camera parameters or a set of geometric and non-linear transformation parameters.

There is also provided a computer readable medium comprising computer executable instructions for performing the method.

There is also provided an electronic device comprising a processor and memory, the memory comprising computer executable instructions for performing the method.

BRIEF DESCRIPTION OF THE DRAWINGS

Embodiments will now be described with reference to the appended drawings wherein.

DETAILED DESCRIPTION

Figure 1:
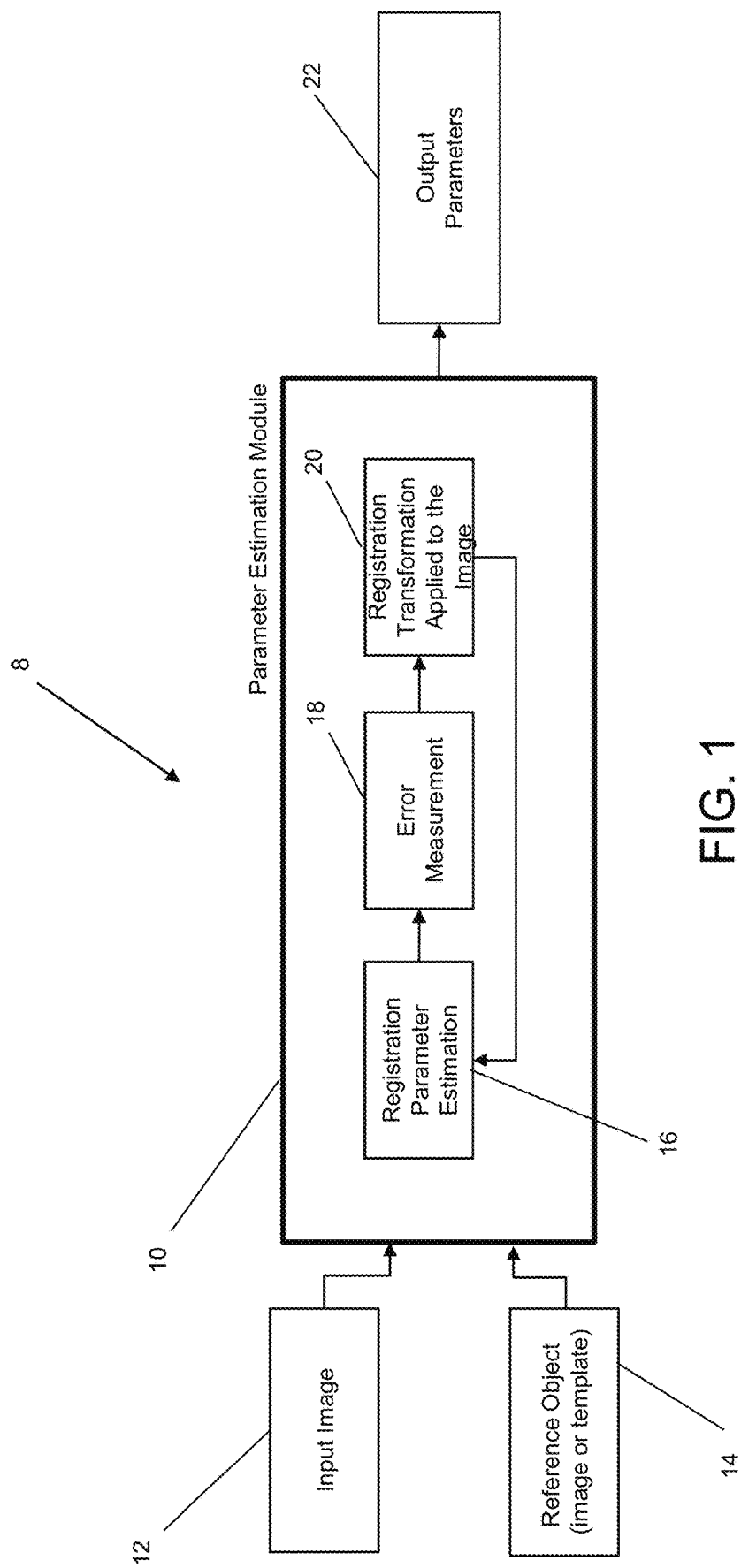
FIG. 1 is a block diagram of a parameter estimation system for estimating camera parameters or geometric and non-linear transformation parameters from an input image and a reference object such as another image or a template.

The following relates to self-camera calibration, planar homography transformation estimation, image registration, and camera pose estimation, which optimizes a learned alignment error objective from observed images, and particularly to continuously re-calibrate and estimate camera parameters from a sequence of observed images. The system adaptively adjusts camera parameters, given a new observed image, to minimize the disparity between the re-projected image into a world coordinates system and a world template with known geometric properties.

The system described herein is configured to register an image to a template or another image using a learning-based optimization process, thereby estimating the homography transformation and camera parameters. In one aspect, the system registers one image to a "reference image", while in another aspect the method registers the image to a so called "template", wherein the template is a representation of one or more 3D objects or one or more 2D planes with known dimensions. The word template can be used interchangeably with 3D objects and/or 2D planes in the following discussion. The system applies: i) an initial estimation process, which generates an initial approximation of the camera parameters or the homography transformation, ii) an error function that estimates the registration error between the received image and the template, iii) and an optimization process to iteratively update the homography transformation parameters to minimize the estimated error. An exemplary embodiment described below includes registering broadcast videos of a sports match or game to sports field models, and estimating the camera parameters. It can be appreciated that the system and methods described herein can also be used for other relevant applications such as simultaneous localization and mapping in robotics applications, camera pose estimation with respect to planar objects with known dimensions, and image-to-image registration for biomedical imaging applications, to name a few.

The following also discloses a method for image registration (with 6 DoF) by learning a mapping function to update a camera pose estimate and simultaneously learn an error function that predicts how well two images are aligned. The registration includes a mapping function that maps pixels from one image to another one, or to the camera pose, and can be either a geometric transformation or a non-linear transformation. The disclosed method includes a two stage process, wherein the first stage, which may be referred to as the initial registration network, provides a rough estimate of the registration, parameterized by a homography transform. The second stage, includes a mapping function that takes the input of the first stage and calculates the error of the estimates, which may be referred to as the registration error network. The two networks can be used to provide an initial guess (using the first network), and refine the hypothesis using the gradients provided by differentiating through the second network. This allows more accurate estimates compared to prior solutions. The term "network" is used here as generic term for a function approximation method and should be not restricted to artificial neural networks (NNs).

The disclosed system can also learn to evaluate registration errors for correction and measure an error metric by aligning a target template and the input image into a common space, which can also be the template space or the image space, and then evaluating its correctness. Aligning the image and the template allows the method to embed the conventional geometry frameworks within the inference process. Although certain aspects of the disclosed system are related to broadcast cameras for sporting events, the systems and methods described herein can be used for calibrating and re-calibrating any camera, aligning images of multiple cameras to a unified space, and registering images of different image modalities.

An exemplary embodiment of the system can use a single image from a sport event broadcast video to register that image to a template by finding the geometric transformation between the two. Certain aspects are directed to a method for aligning sport event images and videos to the sport field template. The system includes an interface for inputting one or more images of the scene and methods for obtaining any of camera calibration, camera orientation and partial or full metric reconstruction of the scene.

Referring now to the figures, FIG. 1 illustrates a parameter estimation system 8 providing a parameter estimation module 10 that can be configured to automatically estimate camera parameters and/or to estimate a geometric and non-linear transformation. Such an automated estimation applies a geometric transformation between an input image 12 and a reference object 14, which may include another image or a template. The transformation can include a homography transformation or generate a set of one or more camera parameters (i.e., a camera calibration). That is, the reference object 14 can be either an image, similar to the input image, or a template of the real world and having a known 3D geometry.

The parameter estimation module 10 in the example configuration shown in FIG. 1 includes modules, routines, processes or units to perform a registration parameter estimation 16, an error measurement 18, and a registration transformation 20, to be applied to the image 12. The initial registration parameter estimation 16 can be a fully automated process, using a function approximation technique or a database search. The initial registration parameters are the parameters of a linear or non-linear function that maps the pixels of the input image 12 to the reference object 14. The initial registration parameters can be used to measure the accuracy of the estimated transformation, or the registration error, using a mechanism for performing the error measurement 18, which can be a separate process or a part of the same registration parameter estimation 16 and is thus shown separately for illustrative purposes. If the error is not acceptable, the registration transformation 20 can be applied to the input image 12 and the process can be repeated as shown in FIG. 1. Prior knowledge can be used in the error measurement 18 if it is available, or the error measurement 18 can learn to estimate the error using function approximation techniques. The module 10 generates a set of one or more output parameters 22, which can include camera parameters, or parameters of the geometric and non-linear transformation, which are numerical values of the intrinsic and extrinsic camera parameters or a subset of them.

Figure 2:
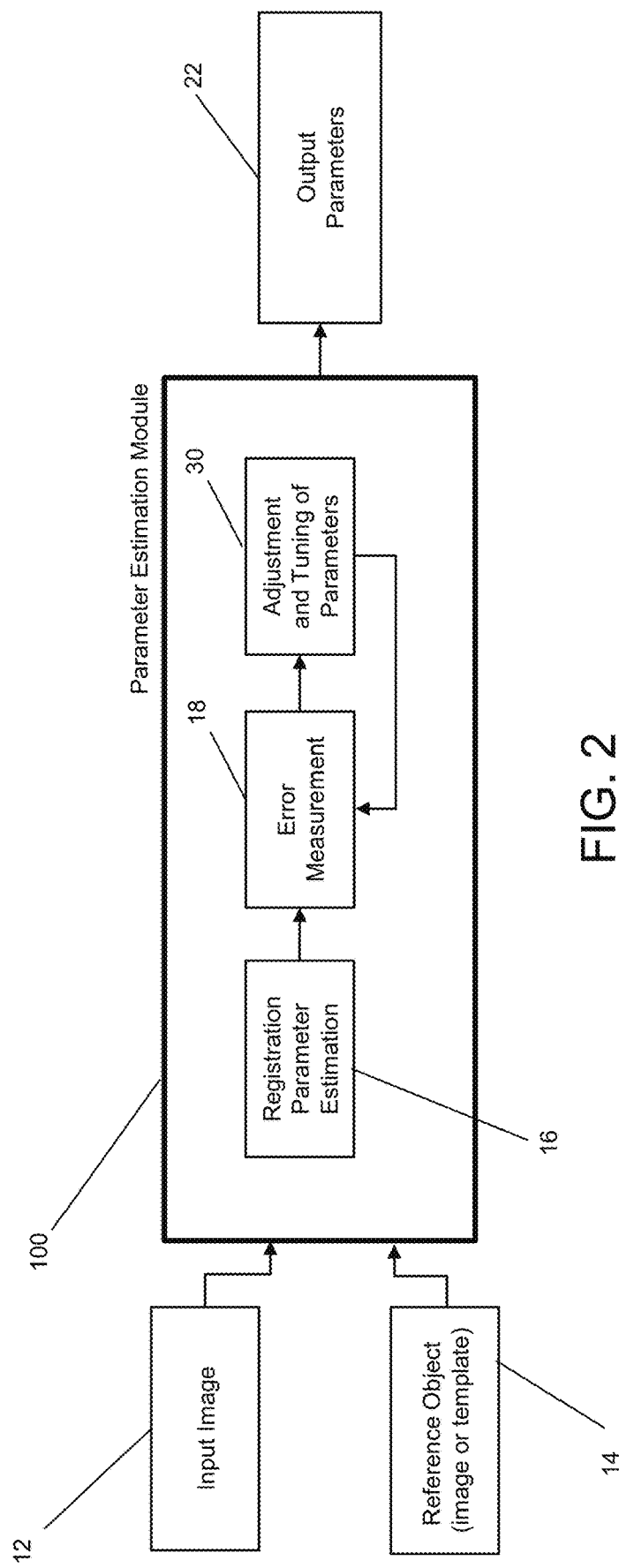
FIG. 2 is a block diagram of a parameter estimation system in an alternative configuration.

FIG. 2 illustrates an alternative configuration for a parameter estimation module 100. In this alternative configuration, a module, routine, process or unit is provided to perform an adjustment and tuning of parameters 30. The process shown in FIG. 2 can also be used for automated estimation of registration parameters to generate output parameters 22 using an error measurement 18, however, in this alternative configuration, after performing the error measurement 18, the registration parameters are adjusted through an optimization process. It may be noted that FIG. 1 and FIG. 2 are representative of two ways in which to apply the iterative process. The iterative process in FIG. 1 applies the estimated transformation on the input image and re-estimates the parameters (repeating the process for convergence), while in FIG. 2 the parameters are adjusted differently. That is, FIGS. 1 and 2 represent two different configurations of the same process.

Figure 3:
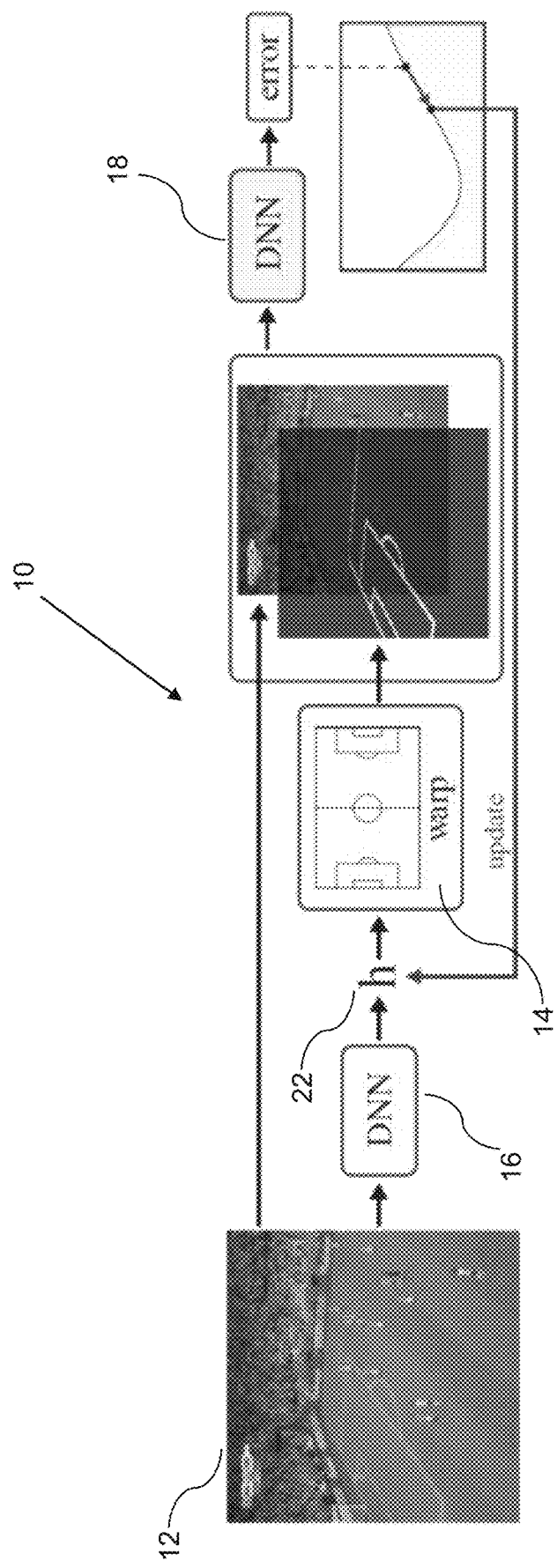
FIG. 3 is a is schematic flow diagram showing an example of a parameter estimation executed using the system shown in FIG. 1 and/or FIG. 2.

FIG. 3 illustrates the registration and optimization process for sports images according to the configuration shown in FIG. 1 and the configuration shown in FIG. 2. Different parameter adjustment methodologies are disclosed in order to minimize the error in the estimated parameters. Given an input image 12, the initial camera pose, or camera parameters, represented here by a homography transformation, h, 22, are obtained using a function approximation technique shown as a DNN 16 that regresses the images directly to the homography parameterization. The reference object 14 (i.e. image, or template) of the sport field model is warped according to this initial estimate. The error estimation process 18 takes the warped template of the input image and estimates the misalignment error between the two. The warping can be applied on the image 12 instead of the reference object 14 (template). The estimated error is then used as an objective function for iteratively optimizing the transformation parameters 22 and to update the parameters to maximize the alignment between the image 12 and the reference object 14 (template).

Figure 4A:
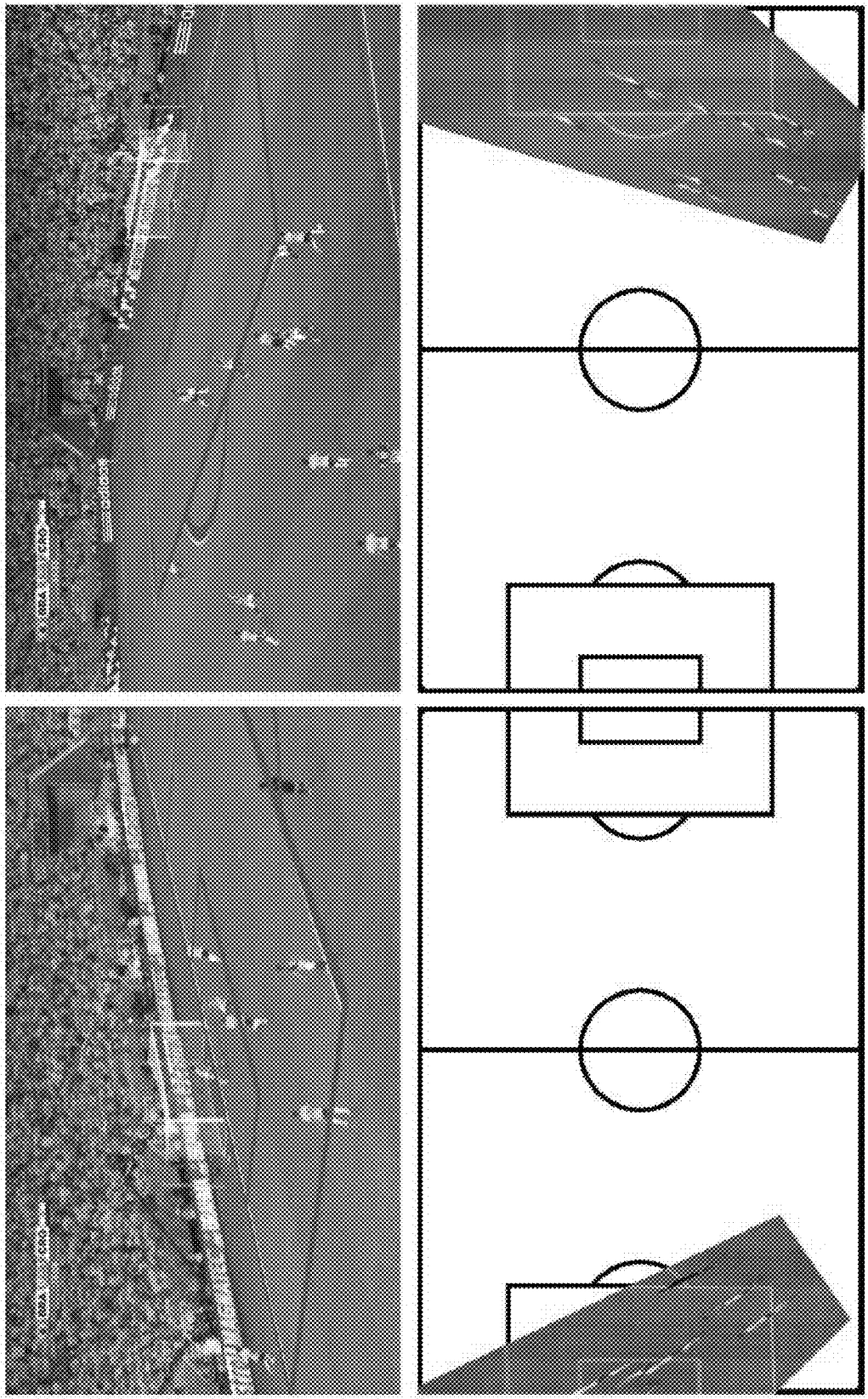
FIG. 4(a) is an example of registering sports images to a template for soccer.
Figure 4B:
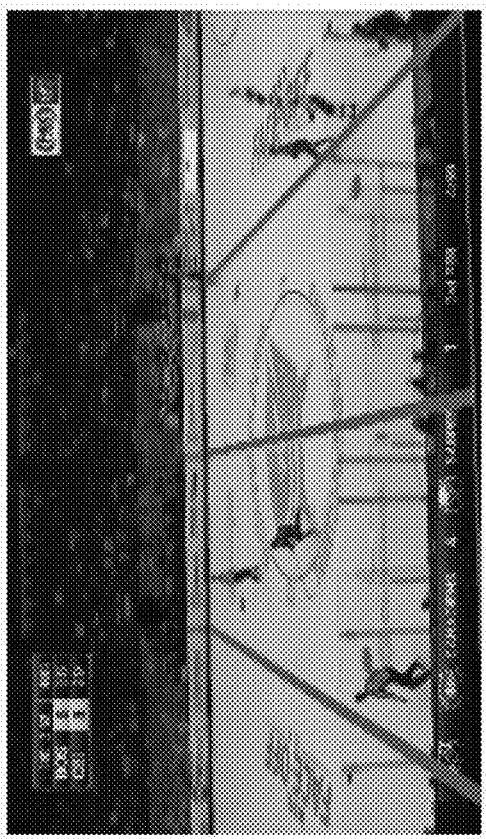
FIG. 4(b) is an example of registering sports images to a template for hockey.
Figure 4B:
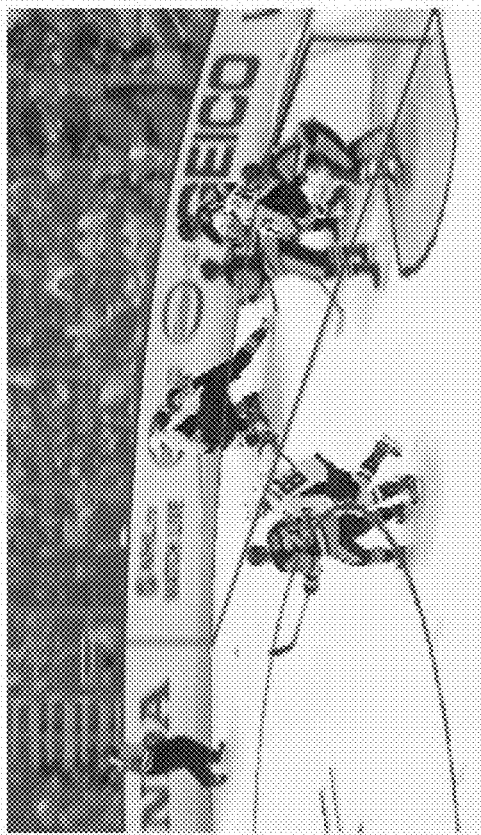
Figure 4B:
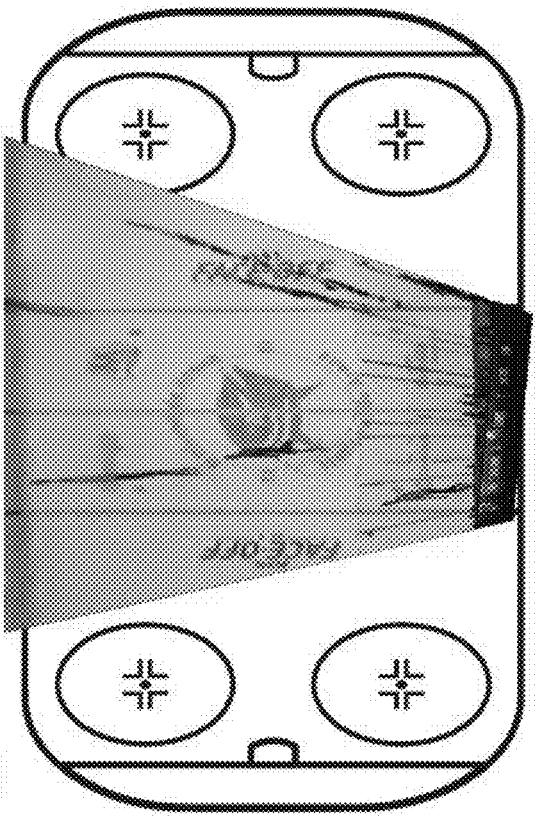
Figure 4B:
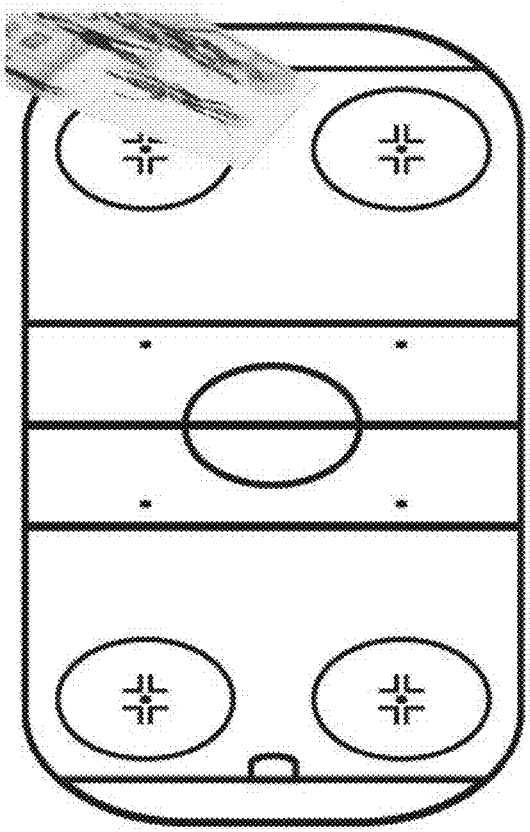

An exemplary embodiment described illustrates how the proposed camera parameter/pose estimation and image registration can be applied for broadcast sports videos. More specifically, the calibration methodology presently described estimates the homography transformation of planar objects by aligning a planar template to the observed image of that template. However, the homography transformation can be augmented with non-linear transformations to model and measure the distortion coefficients in the intrinsic camera parameters, which can be a straightforward process to those familiar with prior camera calibration attempts. The alignment of the image 12 to the reference object 14 (template) can be carried out by optimizing a learned error function that measures the accuracy of the alignment between the transformed image and the transformed template in the same common space, as shown in FIGS. 4(a) and 4(b).

In this exemplary embodiment, one can assume a known planar sports field model 14 and images 12, so that one can represent the image-model alignment with a homography matrix as output parameters 22. The framework can be broken down into two stages: the first stage providing an initial estimate 16 of the homography matrix output 22, and the second stage which iteratively refines this estimate 16. The first stage can follow a function approximation procedure, and a feed-forward paradigm utilizing a function approximation technique such as a deep artificial NN can be employed. However, any method can be used here as an alternative, for example, a database search. With the first stage estimate 16, the model of the playing-field can be warped to the current view, combined with the current observed image 12, and the registration error be evaluated through the second function approximation procedure, i.e. the error measurement 18, which can be chosen to be a NN. The warping of the template 14 and the image 12 is not required to be done necessarily to the current image space and can be done to any arbitrarily chosen space.

To iteratively update the homography output parameters 22 (e.g., as shown in FIG. 2), one can take the derivative of the network output with respect to the initial registration network to obtain a gradient, which gives the direction in which the parameters 22 should be updated and any gradient-based optimization techniques can be used to update the parameters 22. The iterative update, referred to as a refinement process, can be performed iteratively until convergence or until a desired number of maximum iterations is met. Any other optimization method can also be used, including ones that do not require gradients such as Particle Swarm Optimizations (PSOs).

Alternatively, to iteratively update the homography parameters 22 (e.g., as shown in FIG. 1), one can use the output of the initial registration process, apply the estimated registration on one of the images, and then use the transformed images as the input to the process and repeat the same process for initial registration. This process can be done repeatedly until a predefined number of iterations reached or the registration error is lower than an acceptable threshold.

Figure 5:
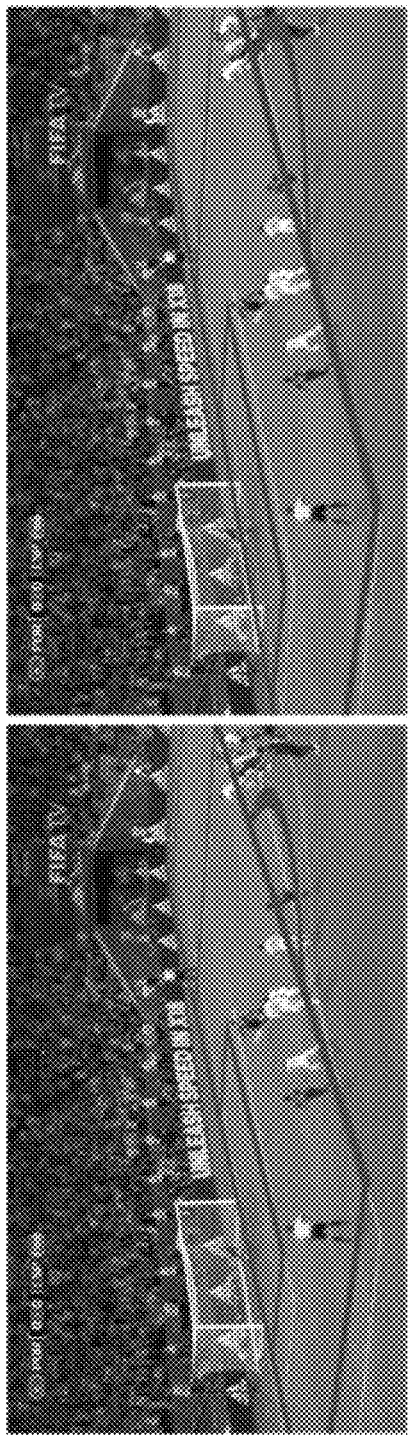
FIG. 5 is an example set of images demonstrating the effect of a number of optimization iterations on registration accuracy.
Figure 5:

FIG. 5 provides an example demonstrating the effect of the number of optimization iterations on the registration accuracy. In this example, the registration result at iteration 0 (i.e. initial registration) can be compared to iterations 20, 40 and 60 to appreciate the improvement in registration accuracy. That is as more optimization iterations are performed, the registration can become more accurate.

Initial Registration

A "projected coordinates for pose" parameterization can be employed and in the case of homographies, this can be done with four (4) points. One can parameterize the homography h defining the relationship between the input image I and the target model m through the coordinates of the four control points on the current input image 12 when warped onto the sports field model.

Specifically, considering a normalized image coordinate system where the width and height of the image are set to one, and the center of the image is at the origin, one can use (−0.5, 0.1), (−0.5, 0.5), (0.5, 0.5), and (0.5, 0.1), that is, the corners of the lower three-fifths of the image 12 as the control points.

The lower parts of the image 12 are used since sport field broadcast videos are typically in a setup where the camera is looking down on the field.

Let $(u_k, v_k)$ denote the k-th control point of the current image I projected onto the template, or sports field model m. One can then write the homography h as $$h = [u_1, v_1, v_2, v_2, u_3, v_3, u_4, v_4]^T.$$

Given an initial registration function, $f_\phi(\cdot)$, one can obtain a rough homography estimate $\hat{h}^{(0)}$ for image I as $\hat{h}^{(0)} = f_\phi(I)$, where the superscript in parenthesis denote the refinement optimization iteration.

Refinement

With the current homography estimate $\hat{h}^{(i)}$ at optimization iteration i, the playing-field model I is warped to obtain an image of the model in the current view, using a bilinear sampler to preserve differentiability. One can concatenate the result of this warping operation $\mathcal{W}(m, \hat{h}^{(i)})$ and the image I, and pass it as input to the model $g_\psi(\cdot)$ to obtain a prediction of the registration error $\hat{\epsilon}^{(i)}$ as:

$$\hat{\epsilon}^{(i)} = g_\psi([I; \mathcal{W}(m, \hat{h}^{(i)})]),$$

where [;] denotes concatenation along the channel direction of two images.

The gradient of $\hat{\epsilon}^{(i)}$ with respect to $\hat{h}^{(i)}$ can be retrieved and this gradient can be applied to retrieve an updated estimate.

Mathematically, it will be written as:

$$\hat{h}^{(i+1)} = \hat{h}^{(i)} + \lambda \nabla_{\hat{h}^{(i)}} \hat{\epsilon}^{(i)},$$

where $\lambda$ is the step size. In practice, instead of pure Stochastic Gradient Descent (SGD), any optimization technique can be used for a more stable optimization.

Learning to Estimate the Mapping Functions

The learning process or training of the function approximation networks for the two stages of the disclosed method can be done either jointly or separately. The exemplary embodiment describes the how the training of the two function approximation networks can be done by decoupling them, however, the training process can readily be performed jointly.

Initial Registration

With the ground-truth homography $h_{gt}$, the function approximation network is trained to minimize:

$$\mathcal{L}_{init} = \|h - h^{(i)}\|_2^2 = \|h - f_\phi(I)\|_2^2$$

where $\|\|_2$ denotes the Euclidean norm. Note that while a deep artificial NN is used to obtain the initial homography estimate, any other method can also be used in conjunction.

Registration Error Network

To train the registration error network, one can create random perturbations on the ground-truth homography. Then, the target model can be warped to the image using the perturbed ground-truth homography, and can be concatenated with the input image 12 to be used as input data for training. The network model is trained to predict a registration error metric, e.g. the mean Intersection-over-Union (IoU). Other registration error metrics such as reprojection error or mutual information score can be used.

In more detail, with the ground truth homography $h_{gt}$, one can create a perturbed homography $h_{pert}$ by applying uniform noise hierarchically: one for global translation, and one for local translation of each control point. Specifically, a common uniform random noise of $\alpha_c \sim U(-\delta_c, \delta_c)$, where $\alpha_c \in \mathbb{R}^8$, is added to all control points, and a separate uniform random noise of $\alpha_s \sim U(-\delta_s, \delta_s)$, where $\alpha_s \in \mathbb{R}^8$, is added individually for each control point. The target model is then warped according to the perturbed homography to create our input data for training.

Thus, the input to the registration error network for training is $[I; \mathcal{W}(m, h_{pert})]$. Then, to train the network, one can minimize:

$$\mathcal{L}_{error} = \|Err(I, \mathcal{W}(m, h_{pert})) - g_\psi([I; \mathcal{W}(m, h_{pert})])\|_2^2$$

where Err(,) is the error metric, for example the IoU value.

Experiments and Results

Initial Registration Network

This exemplary embodiment uses the NNs for function approximation and the exemplary results are obtained using ResNet-18 architecture (reference [11]). It may be noted that any other function approximation technique other that NNs can be used here, and the system 10, 100 is not limited to the use of specific NN architecture. Instead of the classification head, one can simply replace the last fully connected layer to estimate eight (8) numbers without any activation.

Registration Error Network

For the registration error network, one can also rely on the ResNet-18 architecture, but with spectral normalization (reference [12]) on all convolutional layers, and take as input a 6-channel image, that is, the concatenation of the input image 12 and the warped target model. Spectral normalization smooths the error predictions by constraining the Lipschitz constant of the model, which limits the magnitude of its gradients. As the output of the registration error network cannot be negative, one can simply square the output of the network as the final activation function. For the registration network, as the input is very different from a typical image-based network, since the training is done from scratch.

To experimentally evaluate the results of the disclosed method, the tests were conducted on two datasets. The World Cup dataset (reference [7]) is a dataset made of broadcast videos of football plays. At the time of these tests, it had 209 images for training and validation, and 186 images for testing. This dataset is considered extremely small, making it unsuitable for feed-forward deep NNs to be trained on top of. Therefore, the state of the art for this dataset (reference [9]) relies on learning to transfer the input image 12 to look similar to the sports field model, then searching a database of known homographies and warped models to retrieve the estimate. For the experiments, thirty nine (39) images from the train-valid split were used as a validation dataset, and respect the original test split for testing.

The Hockey dataset is composed of broadcast videos of National Hockey League (NHL) ice hockey games (reference [7]). This is a relatively larger dataset than the World Cup dataset, having 1.67 M images in total at the time of these experiments. Of this large dataset, 800 consecutive chunks of images were used as validation and testing, respectively. It is ensured that images from similar timeframes do not fall into different splits. See FIGS. 4(a) and 4(b) for example images. FIGS. 4(a) and 4(b) provide examples of registering sports images to the templates in soccer (FIG. 4(a)) and hockey (FIG. 4(b)). In these images, the upper lines correspond to the sport field lines overlayed on the current view using estimated homographies. The lower current view is overlayed on sport field template.

Baselines

Referring to Table 1 below, the disclosed method has been compared against three existing works for sport-field registration (references [7], [8],[9]). Since there is no publicly available implementation of the two other methods, the results are reported on the respective white papers for the World Cup dataset. For the Hockey dataset, the reported results were taken from reference [7] as a comparison point. In addition, the disclosed method has been compared against feed forward baselines—single stage feed-forward network (SSF) and a two-stage feed-forward refinement network (FFR). It was also further explored whether the error registration network can be used alone by retrieving the initial registration by searching a database of known poses, e.g. the training set, and using the example which gives the lowest error estimate. The initial registration obtained through this method as is referred to as NN, and the fully refined estimate is referred to as NNr.

optimization based inference that is based on learning a registration error function 18 (misalignment) to be optimized.

Using two processes (16, 30), the method makes use of two function approximation components, one that provides an initial estimate for the registration homography, and one that estimates the error of the current hypothesized homography. By optimizing through the registration error network (i.e. error measurement 18), accurate results were obtained.

TABLE 1

Comparative Quantitative Results

|  |  |  | [7] | [8] | [9] | SFF | FFR | IoU$_{whole}$ | IoU$_{part}$ | Reproj. | Joint | NN | NNr |
|---|---|---|---|---|---|---|---|---|---|---|---|---|---|
| World Cup | 1 - IoU$_{whole}$ (%) | mean | 17 | — | 10.6 | 16.1 | 16 | 10.2 | 12.1 | 10.9 | 12.7 | 26.2 | 13.7 |
|  |  | median | — | — | 6.2 | 14.3 | 13.8 | 7.1 | 9.4 | 8.6 | 8.9 | 26.4 | 11.8 |
|  | 1 - IoU$_{part}$ (%) | mean | — | 8.6 | 5.5 | 9.8 | 9.7 | 4.9 | 5.3 | 4.9 | 5.6 | 12.6 | 6.0 |
|  |  | median | — | 7.3 | 3.9 | 8.1 | 7.9 | 3.3 | 3.7 | 3.5 | 3.5 | 10.5 | 4.3 |
| Hockey | 1 - IoU$_{whole}$ (%) | mean | 18[1] | — | — | 13.5 | 7.0 | 3.8 | 4.4 | 5.1 | 12.1 | — | — |
|  |  | median | — | — | — | 12.7 | 6.0 | 3.0 | 3.4 | 4.5 | 10.5 | — | — |
|  | 1 - IoU$_{part}$ (%) | mean | — | — | — | 9.6 | 4.0 | 2.4 | 2.7 | 2.9 | 6.4 | — | — |
|  |  | median | — | — | — | 9.0 | 3.2 | 1.6 | 1.7 | 2.4 | 5.3 | — | — |

Metrics

As existing literature use different metrics (references [7], [8],[9]), IoU$_{part}$ and IoU$_{whole}$, both results are reported. IoU$_{part}$ is the average intersection over union when only the visible region is considered, while IoU$_{whole}$ is the same considering the entire template.

Results

Qualitative highlights are shown in FIGS. 4(a) and 4(b), with quantitative results summarized in Table 1 above.

In Table 1, for the World Cup dataset, the present method performs best in terms of IoU$_{part}$, and comparable to reference [9] in terms of IoU$_{whole}$. Note, however, that the disclosed method does not require a database search. For the Hockey dataset, the disclosed method delivers near perfect results.

As shown in Table 1, having an additional feed-forward refinement network (FFR) only provides minor improvement over the initial estimate (SSF). This phenomenon is more apparent in the WorldCup dataset results, where training data is scarce. By contrast, the error network is able to provide significant reduction in the registration error.

The results can also be compared when a different target error is used for the training of the error network; comparing regressing to IoU$_{whole}$, IoU$_{part}$, and the average reprojection error of all pixels inside the current view (Reproj.). It may be noted that regressing to IoU$_{part}$ does not guarantee best performance in terms of IoU$_{part}$. In all cases, regressing to IoU$_{whole}$ appears to give the best performance.

The two variants, NN and NNr, provide insights into the capability of the error networks. Despite being trained to estimate registration error for a narrow basin, NN provides initial estimates that are even comparable to the single-stage feed-forward network (SSF). With optimization (NNr), the error estimation network gives registration results that are even more accurate than a two-stage feed-forward network. However, the best results can be obtained when the two networks are used together.

The present application therefore discloses a two-stage pipeline for registering images 12 with an exemplary embodiment to register sports field models to broadcast videos accurately. The system described herein can use an In this embodiment, it is shown through experiments that the disclosed method can be trained with very few data, as little as 170 images, and achieve state-of-the-art performance.

This exemplary embodiment discloses the use of one single image as the input for the method, but various modifications to make use of a sequence of images instead of one image are possible within the principles discussed herein. For example, one can naturally embed temporal consistency in a sequence of images by reusing the optimization state for consecutive images.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the parameter estimation module 10, 100, any component of or related to the parameter estimation module 10, 100, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] Mehrsan Javan Roshtkhari, Juan Camilo Gamboa Higuera, Gregory L. Dudek. Systems and Methods for Automated Camera Calibration, US20180336704A1
[2] G Peter K Carr, Iain Matthews. Method And System For Determining Camera Parameters From A Long Range Gradient Based On Alignment Differences In Non-Point Image Landmarks. US patent U.S. Ser. No. 13/737,627.
[3] Anastasia Tkach, Andrea Tagliasacchi, Edoardo Remelli, Mark Pauly, and Andrew Fitzgibbon. Online Generative Model Personalization for Hand Tracking. ACM Transactions on Graphics, 2017.
[4] Yunfang Zhu, Shuiping Li, Xin Du. Parameter calibration method and apparatus. US20150093042A1, 2014.
[5] A. Gupta, J. J. Little, R. J. Woodham. Using Line and Ellipse Features for Rectification of Broadcast Hockey Video. Computer and Robot Vision (CRV), 2011 Canadian Conference on:32-39, 2011.
[6] Jens Puwein, Remo Ziegler, Julia Vogel, and Marc Pollefeys. Robust Multi-view Camera Calibration for Wide-baseline Camera Networks. In IEEE Winter Conference on Applications of Computer Vision, 2011.
[7] N. Homayounfar, S. Fidler, and R. Urtasun. Sports Field Localization via Deep Structured Models. In Conference on Computer Vision and Pattern Recognition, CVPR, 2017.
[8] Rahul Anand Sharma, Bharath Bhat, Vineet Gandhi, and C. V. Jawahar. Automated Top View Registration of Broadcast Football Videos. In IEEE Winter Conference on Applications of Computer Vision, 2018.
[9] Jianhui Chen and James J. Little. Sports Camera Calibration via Synthetic Data. arXiv Preprint, 2018.
[10] Qing Yan, Yi Xu, Xiaokang Yang, and Truong Nguyen. HEASK: Robust Homography Estimation Based on Appearance Similarity and Keypoint Correspondences. Pattern Recognition, 2014.
[11] K. He, X. Zhang, S. Ren, and J. Sun. Deep Residual Learning for Image Recognition. In Conference on Computer Vision and Pattern Recognition, 2016.
[12] Takeru Miyato, Toshiki Kataoka, Masanori Koyama, and Yuichi Yoshida. Spectral Normalization for Generative Adversarial Networks. In International Conference on Learning Representations, 2018.

The invention claimed is:

1. A method for registering input images to reference objects to generate output parameters, the method comprising:
    obtaining an input image from an imaging device;
    obtaining a reference object, wherein the reference object comprises a reference image or a template corresponding to a model of content in the reference image;
    performing a registration of the input image by estimating a geometric transform and/or a set of non-linear transform parameters, without using predefined image features;
    measuring a misalignment error between the input images and the reference object; and
    generating a set of output parameters characterizing the registration as the geometric transform and/or the set of non-linear transform parameters, wherein the geometric transform is associated with intrinsic and extrinsic parameters of the imaging device, and the set of non-linear transform parameters are associated with optical distortion parameters of the imaging device for performing imaging device calibration.

2. The method of claim 1, wherein the registration comprises calibrating the imaging device.

3. The method of claim 2, wherein the input image is received from the imaging device, and wherein a planar surface of an object with known geometry is observable from the received input image and the template corresponds to a shape of the object.

4. The method of claim 2, wherein the imaging device comprises a broadcast camera and the input image is obtained from a sporting event, wherein the geometric transform maps each pixel in the input image to its corresponding location in the real world.

5. The method of claim 1, further comprising performing an iterative parameter adjustment operation between the input image and the reference object to minimize the misalignment error therebetween.

6. The method of claim 5, wherein the iterative parameter adjustment registers two images or the input image and the template, applies the estimated transformation on one of the images, and registers the transformed image to the other image or the template by estimating a geometric transform and/or a set of non-linear transform parameters without using pre-defined image features, wherein the iterative adjustment operation is repeated until a convergence condition is met.

7. The method of claim 5, where is the iterative parameter adjustment comprises an optimization technique that minimizes the misalignment error between the input image and the reference object.

8. The method of claim 1 further comprising estimating the geometric transform or set of non-linear transformation parameters using a function approximation technique.

9. The method of claim 8, wherein the function approximation technique comprises using an artificial neural network.

10. The method of claim 1, further comprising estimating the misalignment error using a function approximation technique.

11. The method according to claim 10, wherein the function approximation technique comprises using an artificial neural network.

12. The method of claim 10, wherein the misalignment error is measured using a reprojection error between one or more anchor points in two images being aligned, an intersection over union, or a mutual information score between the registered images after applying the registration technique.

13. The method of claim 1, further comprising learning an estimate for the misalignment error between the input image and the reference object.

14. The method of claim 1, wherein the image shows a part of a sports field and the template comprises a shape of the sports field.

15. The method of claim 14, wherein the geometric transform comprises a homography between an image of the sports field and its template.

16. A non-transitory computer readable medium comprising computer executable instructions for registering input images to reference objects to generate output parameters, comprising instructions for:
obtaining an input image from an imaging device;
obtaining a reference object, wherein the reference object comprises a reference image or a template corresponding to a model of content in the reference image;
performing a registration of the input image by estimating a geometric transform and/or a set of non-linear transform parameters, without using predefined image features;
measuring a misalignment error between the input images and the reference object; and
generating a set of output parameters characterizing the registration as the geometric transform and/or the set of non-linear transform parameters, wherein the geometric transform is associated with intrinsic and extrinsic parameters of the imaging device, and the set of non-linear transform parameters are associated with optical distortion parameters of the imaging device for performing imaging device calibration.

17. An electronic device comprising a processor and memory, the memory comprising computer executable instructions for registering input images to reference objects to generate output parameters, comprising instructions for:
obtaining an input image from an imaging device;
obtaining a reference object, wherein the reference object comprises a reference image or a template corresponding to a model of content in the reference image;
performing a registration of the input image by estimating a geometric transform and/or a set of non-linear transform parameters, without using predefined image features;
measuring a misalignment error between the input images and the reference object; and
generating a set of output parameters characterizing the registration as the geometric transform and/or the set of non-linear transform parameters, wherein the geometric transform is associated with intrinsic and extrinsic parameters of the imaging device, and the set of non-linear transform parameters are associated with optical distortion parameters of the imaging device for performing imaging device calibration.

18. The electronic device of claim 17, coupled to the imaging device or incorporated into the imaging device.

19. The electronic device of claim 17, further comprising instructions for performing an iterative parameter adjustment operation between the input image and the reference object to minimize the misalignment error therebetween.

20. The electronic device of claim 17, wherein the registration comprises calibrating the imaging device.

* * * * *